United States Patent [19]

Evstratov et al.

[11] Patent Number: 4,998,846

[45] Date of Patent: Mar. 12, 1991

[54] CONCRETE DAM BOTTOM DISCHARGE WORKS

[76] Inventors: Jury I. Evstratov, Vyazemsky pereulok, 6, kv. 110; Viktor V. Kononov, ulitsa Lenskaya, 9, korpus 2, kv. 10; Oleg L. Sandigursky, ulitsa Budapeshtskaya, 19, korpus 2, kv. 68; Mikhail T. Nerovny, prospekt M.Toreza, 40, korpus I, kv. 4; Sergei V. Larionov, Aviatsionnaya ulitsa, 18, kv. 76; Oleg I. Evstratov, ulitsa Pinegina, 21/26, kv. 18, all of Leningrad, U.S.S.R.

[21] Appl. No.: 468,595

[22] Filed: Jan. 23, 1990

[30] Foreign Application Priority Data

Jan. 26, 1989 [SU] U.S.S.R. .............................. 4641769

[51] Int. Cl.$^5$ ............................................. E02B 9/08
[52] U.S. Cl. ........................................ 405/78; 290/52; 405/75
[58] Field of Search ................................ 405/75–78; 290/42, 43, 53, 52

[56] References Cited

U.S. PATENT DOCUMENTS

| 1,263,059 | 4/1918 | Harza | 405/78 |
| 1,833,146 | 11/1931 | Woodard | 405/78 |
| 2,072,930 | 3/1937 | Voorduin | 405/78 |
| 4,143,990 | 3/1979 | Atencio | 405/78 |
| 4,319,142 | 3/1982 | Mayo | 290/52 |
| 4,573,827 | 3/1986 | Mayo | 405/75 X |
| 4,674,279 | 6/1987 | Ali et al. | 290/52 X |

FOREIGN PATENT DOCUMENTS

| 1045296 | 6/1953 | France | 405/85 |
| 0096318 | 6/1984 | Japan | 405/78 |

Primary Examiner—Dennis L. Taylor
Attorney, Agent, or Firm—Burgess, Ryan & Wayne

[57] ABSTRACT

Bottom discharge works of a concrete dam comprise a bottom water conduit provided within the dam body and a block attached thereto at the tail-water end. In the lower portion of the attached block, there are provided a turbine chamber with a hydroelectric unit and a draught tube, while the upper portion of the attached block represents a water discharge chute. An opening with a gate is provided in the ceiling of the turbine chamber, at its inlet from the bottom water conduit.

6 Claims, 5 Drawing Sheets

CONCRETE DAM BOTTOM DISCHARGE WORKS

FIELD OF THE INVENTION

The present invention relates generally to hydraulic power engineering and more particularly, to structures for water-power plants. The invention can be most successfully used in concrete dam works for controlling floods of normal intensity as well as those at maximum and submaximum flow rates.

BACKGROUND OF THE INVENTION

Presently, when operating bottom discharge works, the energy of the water discharged therethrough is generally lost. Utilization of this energy for generating electric power under increasing power deficiency conditions is of primary importance.

The known bottom discharge works in a concrete dam are tubular water conduits of a circular, or predominantly rectangular, cross-section. In the water conduit, at the head-race end or, sometimes, at the tail-water end thereof, there are provided gates covering the section of the water conduits (M. M. Grishin, N. P. Rozanov, L. D. Bely, P. I. Vasiliev, P. I. Gordienko, V. F. Ivanischev, V. G. Orekhov "Betonnye plotiny (na skalnykh osnovaniyakh)", 1975, Stroiizdat, Moscow, p. 116–117).

No structural units are provided in the works in question that would utilize the energy of the water discharged through these works to increase their power capacity.

Known in the art are concrete dam bottom discharge works comprising a gated bottom water conduit incorporated in the body of the dam (SU, A, 1368457).

The above discharge works are designed to perform water discharge for controlling floods, including those of maximum and submaximum strength. The energy of the water passing through the discharge works is not utilized, which is a serious drawback of the water discharge works described because of the need of additional energy we are often encountered with.

SUMMARY OF THE INVENTION

It is an object of the invention to increase the power of a water-power plant.

With this object in view, bottom discharge works of a concrete dam separating the head race and the tail water comprise a bottom water conduit provided inside the concrete dam, gates mounted in said bottom water conduit, and an attached block adjoining to the bottom water conduit at the tail-water end thereof. In the lower part of the attached block, there is a turbine chamber connected with said bottom water conduit and a draught tube connected with the turbine chamber. An opening with the gate mounted therein is provided in the ceiling of the turbine chamber where it joins the bottom water conduit. A hydroelectric unit is mounted inside the turbine chamber. A water discharge chute is provided at the top of the attached block, the opening made in the ceiling of said turbine chamber serving as the inlet of the dischage chute.

The provision of an attached block in the proposed bottom discharge works realized in the aforementioned manner allows generation of an additional energy, when normal-intensity flood water passes through the water discharge works, thus increasing the overall power of the hydrosystem.

It is preferred that the hydroelectric unit be capable of being removed from the turbine chamber. According to one embodiment, this capability is realized as follows: the hydroelectric unit is preferably mounted along vertical guides and is provided with a drive for its displacement in the vertical plane extending through the axis of the turbine chamber.

According to another embodiment of the above capability, the hydroelectric unit is preferably supported by a hinge and is provided with a drive to be pivoted in the vertical plane extending through the axis of the turbine chamber.

These embodiments allow the turbine chamber to be cleared to increase the carrying-capacity of the attached block in the event of maximum and submaximum floods. In addition, in the first of said embodiments, an ease of inspection and repair maintenance of the hydroelectric unit is ensured.

It is advisable that the draught tube of the attached block be terminated in the discharge chute.

Termination of the draught tube in the discharge chute eliminates the effect of the tail-water level variations on the operation of the hydroelectric unit.

A sill is preferably provided at the outlet from the discharge chute to the tail-water area.

This sill enables the water level to be set in the chute such as to provide the required operating depth of the hydroelectric turbine-wheel necessary for its operation under optimum conditions regardless of the tail-water level.

The invention is further illustrated by a detailed description of its embodiments with reference to the accompanying drawings in which:

Figure 1:
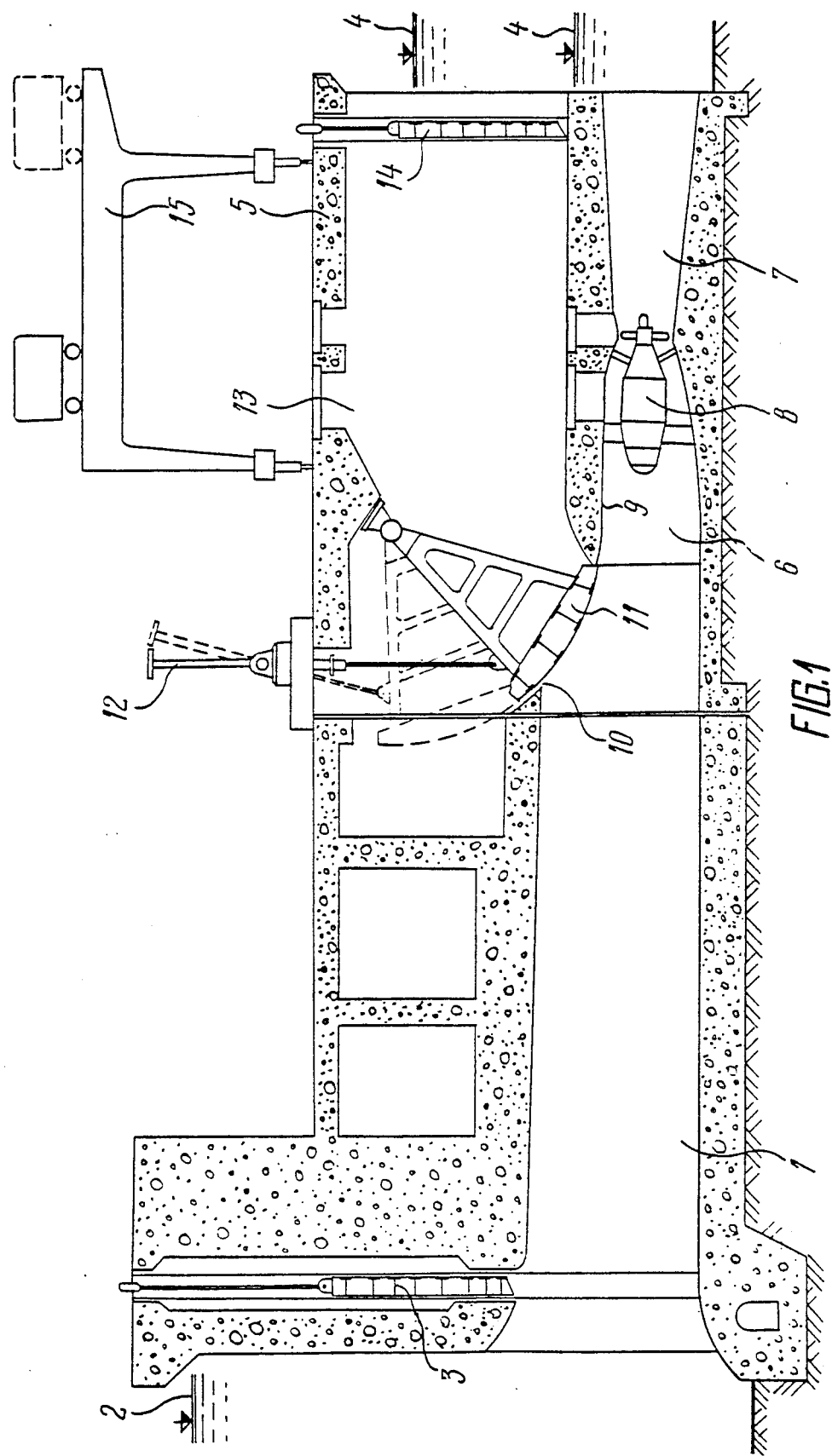
FIG. 1 shows bottom discharge works of a concrete dam, according to the invention, a longitudinal section.

Bottom discharge works of a concrete dam comprise a bottom water conduit 1 (FIG. 1) provided within the dam, with gates 3 mounted therein as viewed from a head-race area 2, and an attached block 5 adjoining to the bottom water conduit 1 as viewed from a tail-water area 4. Located in the lower part of the attached block 5 are a turbine chamber 6 with its inlet joined to the outlet of the bottom water conduit 1 and a draught tube 7 connected with the turbine chamber 6. A hydroelectric unit 8 is placed within the turbine chamber 6. Provided in a ceiling 9 of the turbine chamber 6, at its inlet from the bottom water conduit 1, is an opening 10 with a gate 11 mounted therein, which is equipped with a drive 12. The upper part of the attached block 5 is a water discharge chute 13 using the opening 10 as its inlet from the bottom water conduit 1. At the outlet from the water discharge chute 13 to the tail-water area 4, there is provided a gate 14. A drive 15, e.g. in the form a travelling gantry crane, serves to lift and to lower the gate.

Figure 2:
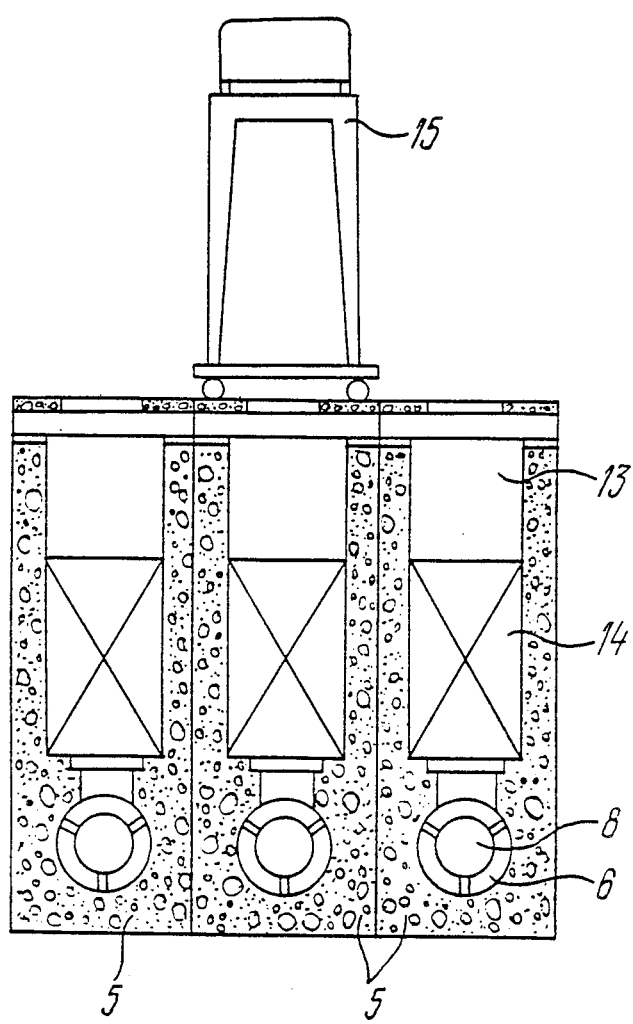
FIG. 2 is a section on the line II—II of FIG. 1.

The number of said attached blocks 5 is determined by the number of the bottom water conduits 1 provided within the concrete dam structure (FIG. 2).

In the proposed bottom discharge works, the hydroelectric unit 8 may be adapted to be removable from the turbine chamber 6.

Figure 3:
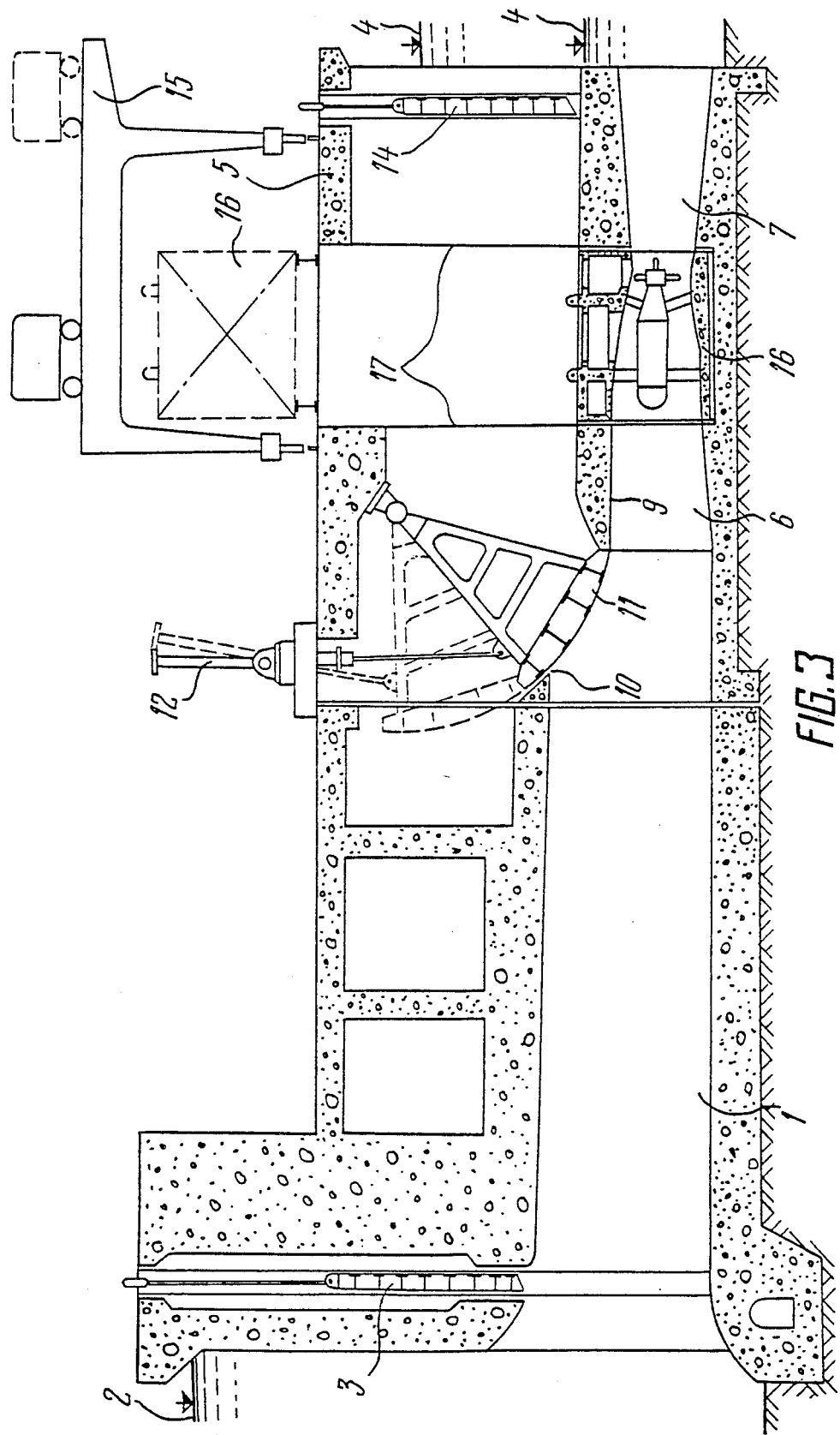
FIG. 3 shows bottom discharge works of a concrete dam, with one embodiment of the turbine chamber.

FIG. 3 shows an embodiment of the proposed bottom discharge works wherein the hydroelectric unit 8 is enclosed within a casing 16 fitted on vertical guides 17 to enable it to be moved, along with the hydroelectric unit 8, in the vertical plane extending through the axis of the turbine chamber 6. The gantry crane 15 acts as a drive for said displacement.

Figure 4:
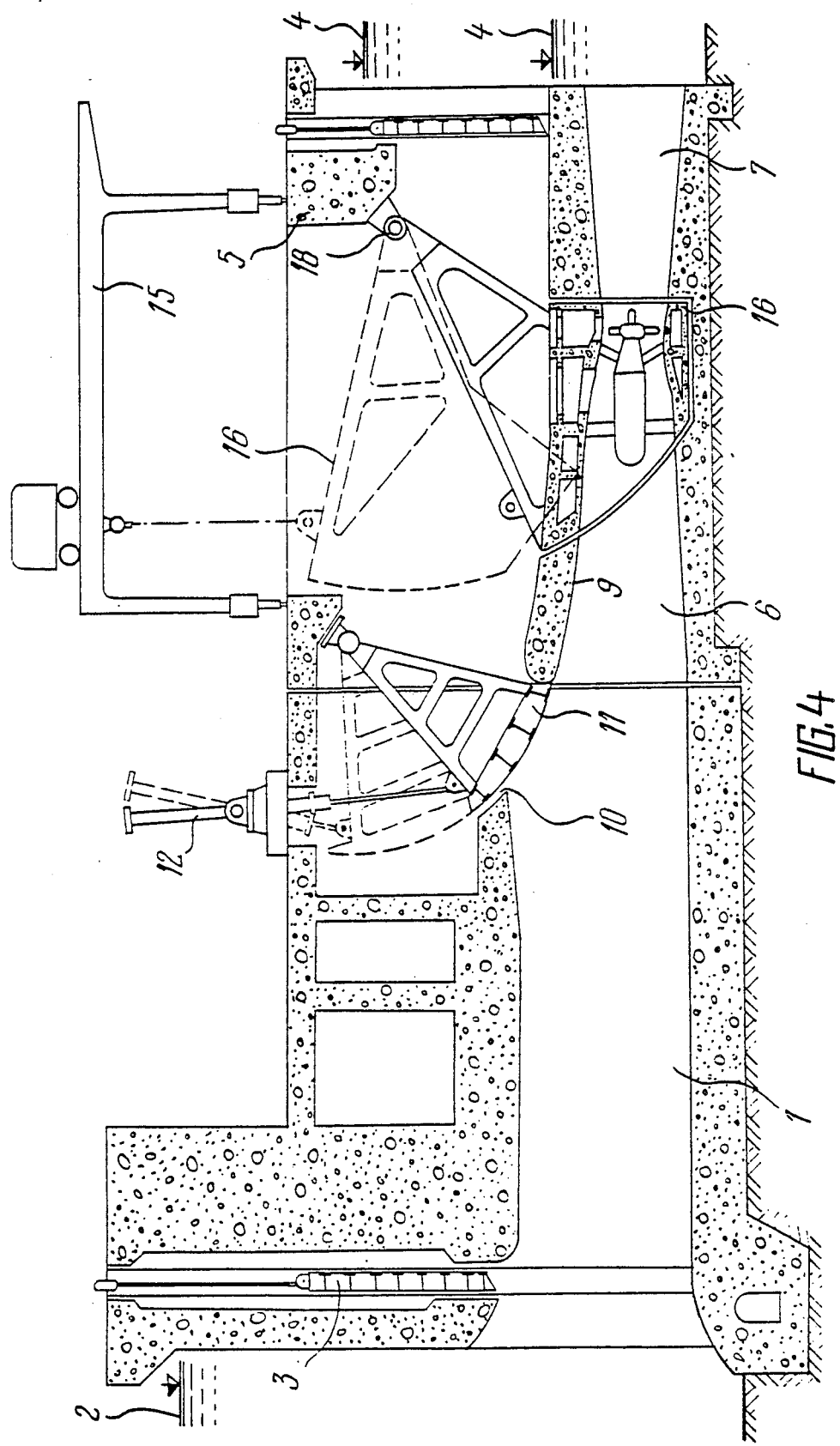
FIG. 4 shows bottom discharge works of a concrete dam, with another embodiment of the turbine chamber.

FIG. 4 shows an embodiment of the proposed bottom discharge works wherein the casing 16 with the hydroelectric unit 8 enclosed therein is mounted on a hinged support 18 to be rotated, together with the unit 8, about the hinged support 18, in a vertical plane extending through the axis of the turbine chamber 6. The gantry crane 15 acts as a drive for said displacement.

Other design modifications to implement the withdrawal of the hydroelectric unit 8 from the turbine chamber 6 are also possible.

Figure 5:
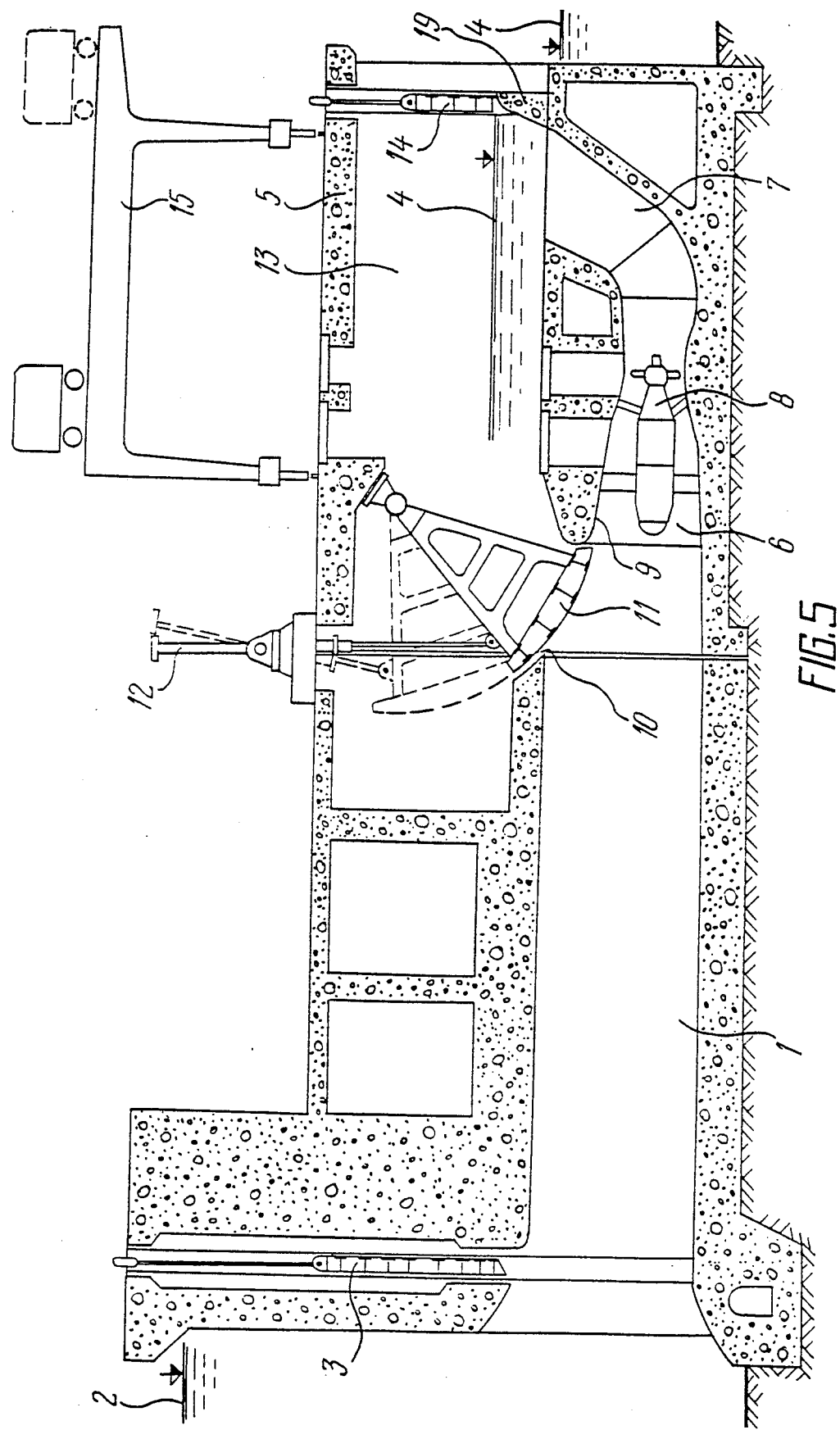
FIG. 5 represents an embodiment of the bottom discharge works of a concrete dam, with the draught tube terminating in the water discharge chute.

The draught tube 7 may be brought out into the discharge chute 13 (FIG. 5). Such implementation of the draught tube 7 prevents the operation of the hydroelectric unit 8 from being influenced by the water level in the tail-water area 4.

A sill 19 is provided at the outlet from the discharge chute 13 to the tail-water area 4. The presence of the sill enables a water level to be set in the chute 13 allowing the required depth of the turbine wheel of the hydroelectric unit 8 regardless of the level in the tail-water area 4, thus resulting in the maximum power of the hydroelectric unit 8 when generating electric energy.

The operation of the bottom discharge works now follows.

To utilize the hydraulic energy stored in the head race 2, the gates 3 are opened and the water runs along the bottom water conduit 1 into the turbine chamber 6 of the attached block 5, and electric power is generated. In this case, the opening 10 is covered by the gate 11, and the draught tube 7 communicates with the tail-water area 4.

With maximum or submaximum water flow rates required in the case of flood, the gates 3 are opened. Also opened is the gate 11 that had covered the opening 10, while the hydroelectric unit 8 is braked. The gate 14 at the outlet of the discharge chute 13 is lifted. The water flows through the opening 10 into the discharge chute 13, and is drained into the tail-water 4. When the flood with maximum or submaximum flow rates is over, the gates 11 and 14 are closed and the hydroelectric unit 8 unbraked. The attached block 5 is reset to generate electric power when passing floods of normal intensity or making useful water drawdowns from the head race 2.

In an embodiment of FIG. 3, the submaximum floods are passed through the opening 10 and the discharge chute 13, while the maximum (catastrophic) floods are passed after the casing 16 with the hydroelectric unit 8 has been lifted along the vertical guides 17 to the upper position, by means of the gantry crane 15. This enables the turbine chamber 6 to be cleared to increase the water-carrying capacity of the attached block 5 during the maximum and submaximum floods. In addition, when the hydroelectric unit 8 is in the upper position, it is made accessible for inspection and repair.

In an embodiment of FIG. 4, when passing maximum floods, the casing 16 and the hydroelectric unit 8 are swung about the hinged support 18 by means of the gantry crane 15. Similarly to the previous embodiment, it also clears the turbine chamber, increasing the water-carrying capacity of the attached block.

The bottom discharge works represented in FIG. 5 operate in the same way as the works shown in FIG. 1 except that in the process of generating electric power, the water, after passing the turbine chamber 6 with the hydroelectric unit 8, is supplied through the draught tube 7 to the discharge chute 13. With such arrangement of the draught tube 7, a water level is adjusted in the discharge chute 13 such as to prevent the level variation in the tail-water area 4 from influencing the operation of the hydroelectric unit 8.

What we claim is:

1. Bottom discharge works of a concrete dam separating the head-race and the tail-water areas, comprising:
   a bottom water conduit incorporated within said concrete dam,
   gates mounted in said bottom water conduit,
   an attached block adjoining to said bottom water conduit at said tail water end and having an upper portion and a lower portion,
   a turbine chamber including an area where it joins said bottom water conduit and further, including a ceiling, an opening being provided in said ceiling in said junction area between the turbine chamber and said bottom water conduit,
   a gate mounted in said opening of the turbine chamber,
   a hydroelectric unit mounted in said turbine chamber,
   a draught tube connected with the turbine chamber, said turbine chamber and said draught tube being located in said lower portion of the attached block,
   a water discharge chute having an outlet to said tail-water area and provided in said upper portion of the attached block, said opening made in the ceiling of said turbine chamber representing an inlet to said water discharge chute.

2. Bottom discharge works according to claim 1, wherein said hydroelectric unit is mounted to be removable from said turbine chamber.

3. Bottom discharge works according to claims 1 or 2, wherein said hydroelectric unit is mounted between vertical guides and provided with a drive for its displacement in a vertical plane extending through the axis of said turbine chamber.

4. Bottom discharge works according to claims 1 or 2, wherein said hydroelectric unit is mounted on a hinged support and is provided with a drive for its displacement in a vertical plane extending through the axis of said turbine chamber.

5. Bottom discharge works according to claims 1 or 2, wherein said draught tube is brought out into said water discharge chute.

6. Bottom discharge works according to claim 5, wherein a sill is provided at said outlet from the discharge chute to said tail-water area.

* * * * *